(12) United States Patent
Huck

(10) Patent No.: US 6,985,576 B1
(45) Date of Patent: Jan. 10, 2006

(54) METHOD AND APPARATUS FOR AUTOMATIC CALL DISTRIBUTION

(75) Inventor: Kevin Huck, Woodland Park, CO (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/453,108

(22) Filed: Dec. 2, 1999

(51) Int. Cl.
*H04M 3/00* (2006.01)

(52) U.S. Cl. .......................... 379/265.09; 379/218.01; 379/265.02; 379/265.11; 379/265.12; 379/265.13; 370/352; 370/353; 370/354; 370/355; 370/356

(58) Field of Classification Search ................ 370/352, 370/353, 354, 355, 356; 379/88.12, 88.13, 379/88.14, 88.17, 88.19, 265.02, 265.09, 379/900, 201.03, 218.01, 265.11, 265.12, 379/265.13
See application file for complete search history.

(56) References Cited

U.S. PATENT DOCUMENTS

| | | | |
|---|---|---|---|
| 6,122,364 A * | 9/2000 | Petrunka et al. ........ 379/265.02 |
| 6,215,783 B1 * | 4/2001 | Neyman ...................... 370/353 |
| 6,249,820 B1 * | 6/2001 | Dobbins et al. ............ 709/238 |
| 6,278,532 B1 * | 8/2001 | Heimendinger et al. .... 358/442 |
| 6,337,858 B1 * | 1/2002 | Petty et al. .................. 370/356 |
| 6,360,266 B1 * | 3/2002 | Pettus ......................... 709/227 |
| 6,373,836 B1 * | 4/2002 | Deryugin et al. ............ 370/352 |
| 6,377,944 B1 * | 4/2002 | Busey et al. .................... 707/3 |
| 6,404,875 B2 * | 6/2002 | Malik et al. ............ 379/211.03 |
| 6,456,749 B1 * | 9/2002 | Kasabach et al. ........... 382/314 |
| 6,625,643 B1 * | 9/2003 | Colby et al. ................ 709/217 |
| 6,658,106 B1 * | 12/2003 | Atkinson et al. ...... 379/265.11 |

\* cited by examiner

*Primary Examiner*—Bing Bui (57) ABSTRACT

An Internet Protocol (IP) call distribution system, for selecting agents to handle incoming requests from users, that uses publish/subscribe technology so that agent state does not need to be maintained. An automatic call distribution method for selecting agents to handle incoming requests from users, that uses publish/subscribe technology so that agent state does not need to be maintained.

30 Claims, 5 Drawing Sheets

FIG. 5

METHOD AND APPARATUS FOR AUTOMATIC CALL DISTRIBUTION

TECHNICAL FIELD

The invention relates to automatic call distribution systems and methods. The invention also relates to methods and apparatus for routing calls or data.

BACKGROUND OF THE INVENTION

Automatic call distribution systems are known in the art. In one form of automatic call distribution system, a caller is greeted with a message and asked to remain on the line for the next available agent. In addition to keeping callers waiting on hold until an agent is free, automatic call distribution systems are used commonly with workgroups. A group of agents (e.g., sales agents or technical support agents) share responsibility for handling calls that are placed into their department. The automatic call distribution system decides how to route calls to agent's phones and places overflow calls into a queue until there is an available agent. Also, the automatic call distribution system can be used to route callers to a workgroup that contains people who are most qualified to answer the caller's questions. Agents can be added to a workgroup if they obtain a desired level of skill, e.g. knowledge of a certain product line associated with the workgroup.

The queue keeps track of the order in which callers called and may also play update messages assuring the caller that their call is important and may give the caller the option of leaving a voicemail message instead of continuing to hold. Some automatic call distribution systems inform the caller of the approximate or average wait time or their position in the queue so the caller can judge whether to continue holding.

In certain automatic call distribution systems, an incoming phone call is routed to an appropriate person, typically in response to identification of the caller by caller ID.

One use of automatic call distribution systems is in connection with businesses that have a common phone number, such as an 800 number, that is advertised in a large geographic area. When a customer or potential customer calls the number, an automatic call distribution system automatically routes the call to a local store or service provider, whose service area encompasses the location from where the caller is calling. The local store may be a franchise, corporate owned, or otherwise affiliated with the company that advertises the phone number. For example, a business may advertise the same, easy to remember phone number in many geographic locations, so that someone who travels or moves does not have to memorize multiple phone numbers. When the client or potential client calls the number, the call is routed to a local office or location of the company.

Alternatively, a company may have one call center that handles all calls. Calls from certain people are routed in a particular manner based on rules applied for the caller. For example, callers who have an existing account or who are previous callers may be routed to a different person than a first time caller or their call may be processed before a first time caller. Alternatively, a caller who is known to speak a certain language may be routed to someone who speaks that language.

Such automatic call distribution systems sometimes rely on technology to automatically identify the telephone number of the calling party. See, for example, U.S. Pat. No. 5,163,087 to Kaplan (incorporated herein by reference) which discloses a system that translates an Automatic Number Identification (ANI) of the calling party into a customer database key or customer account number previously defined by the called party. The called business can then process the key to look up customer information and present it to a customer service representative of the called business. ANI information is useful if the business has a customer record for the calling party, e.g. in view of a previous phone call.

Attention is directed to the following U.S. patents, which relate to automatic call routing, and which are incorporated herein by reference: U.S. Pat. No. 5,963,625 to Kawecki et al.; U.S. Pat. No. 5,956,397 to Shaffer et al.; U.S. Pat. No. 5,946,387 to Miloslavsky; U.S. Pat. No. 5,946,386 to Rogers et al.; U.S. Pat. No. 5,920,621 to Gottlieb; U.S. Pat. No. 5,910,983 to Dezonno et al.; U.S. Pat. No. 5,867,493 to Zisapel; U.S. Pat. No. 5,838,682 to Dekelbaum et al.; U.S. Pat. No. 5,784,451 to Smith, Jr.; and U.S. Pat. No. 5,724,418 to Brady.

Prior art automatic call distribution systems typically maintain state, or know about all agents and what they are doing at any given time. This centralizes capability and limits scalability and flexibility.

SUMMARY OF THE INVENTION

The invention provides an Internet Protocol (IP) call distribution system, for selecting agents to handle incoming requests from users, that uses publish/subscribe technology so that agent state does not need to be maintained.

In another aspect of the invention, an IP gateway is configured to convert PSTN phone calls to Internet Protocol phone calls. The IP gateway is configured to pass ANI information, if available, from the PSTN phone call.

In another aspect of the invention, a server is configured to be coupled to the IP gateway by an Internet Protocol network, and configured to be coupled to agent workstations by an Internet Protocol network. The server has a computer readable media bearing publish/subscribe software. The server further includes a memory storing call processing rules which determine how incoming calls are to be handled, and a memory storing a customer database including records about customers and customer identification information, such as ANI information, associated with the customers.

In another aspect of the invention, the server is configured, for respective incoming calls, to search the customer database for a record for the user, by searching for a record containing the customer identification information for the call. The server is further configured to apply rules appropriate for the user, using the rules engine, to determine a subset of agents with skills required to communicate with the user. The server is further configured to broadcast an event to the subset of agents indicating that a call is available to be handled. The server is configured to receive responses from available agents of the subset and to select an available agent of the subset and pass the call to the selected agent. The agents subscribe to skills using the publish/subscribe software.

One aspect of the invention provides an automatic call distribution method for selecting agents to handle incoming requests from users, that uses publish/subscribe technology so that agent state does not need to be maintained.

DETAILED DESCRIPTION OF THE PREFERRED EMBODIMENTS

Figure 1:
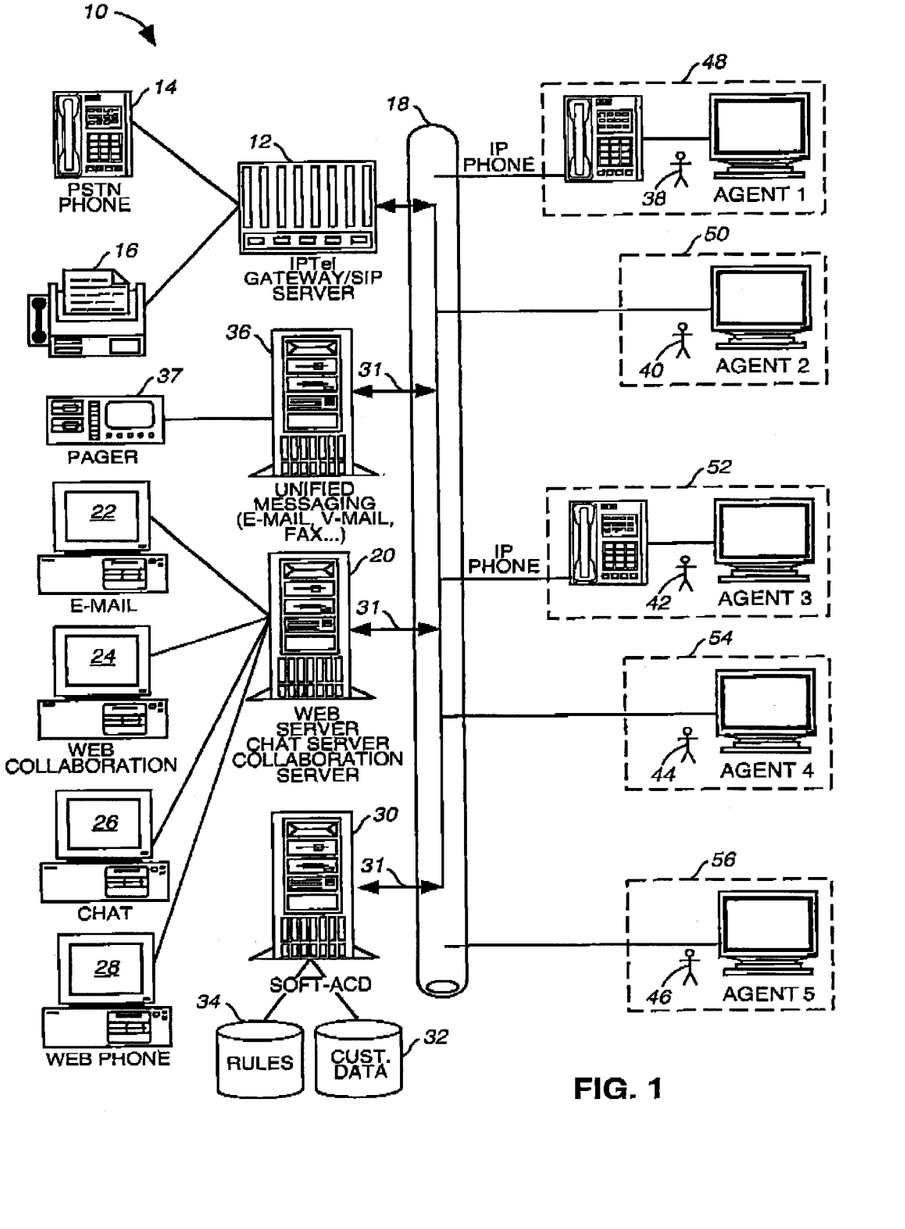
FIG. 1 is a block diagram illustrating components included in a system embodying one aspect of the invention.

FIG. 1 shows a system 10 in accordance with one embodiment. The system 10 shown in FIG. 1 includes basic components as might be used in a multi-media system. Additional or fewer components could be employed.

The system 10 includes an Internet telephony gateway 12 that provides for communications between a standard telephone and an Internet Protocol phone (e.g., to allow for telephone calls over the Internet).

The Internet telephony gateway 12 takes voice or fax calls from the circuit-switched PSTN (Public Switched Telephone Network, e.g., a system used by conventional home phones) and places them on a packet-switched network, such as the Internet, for use with an IP phone. One or more such gateways 12 could be located such that a call to them would be a local phone calls for the calling party, and such that a network 18 is used for the long distance transmission. The network 18 can be the Internet or a local or wide area network that uses the Internet Procol, such as Novell Netware 5 ™ network. Thus, expenses are reduced by avoiding long distance charges. Internet telephony gateways are commercially available, and can be used to provide communications from one phone to another, from a phone to a fax, from a phone to a computer, or from a computer to a phone. For example, one gateway that could be used for the Internet telephony gateway server 12 is the VocalTec ™ telephony gateway, available from VocalTec Communications limited, One Executive Drive, Suite 320, Fort Lee, N.J. 07024. Another gateway that could be used for the Internet telephony gateway 12 is the MICOM ™ V/IP phone and fax gateway, available from Nortel Networks, 8200 Dixie Road, Brampton, Ontario, Canada L6T 5P6, and also sold by Hello Direct, 5893 Rue Ferrari, San Jose, Calif. 95138-1857. The Internet telephony gateway 12 can use any of various signaling protocols. For example, in the illustrated embodiment, the gateway 12 is an IPTel Gateway which acts as an SIP Server. IPTel stands for Internet Protocol telephony. SIP stands for Session Initiation Protocol, a standard for IP (Internet Protocol) voice communication. Further information can be obtained from IETF, the Internet Engineering Task Force, or from their web site. In an alternative embodiment, instead of using the SIP signaling protocol, the server acts as an H.323 Gateway, using the H.323 protocol. H.323 is a standard for IP Voice. The H.323 standard is known in the art and provides for communications between a standard telephone and an Internet Protocol phone. Further information about H.323 can be obtained from the International Telecommunications Union (ITU), or from their web site. Alternatively, a proprietary implementation could be employed, if desired.

Although shown as a single component, the gateway 12 may include more than one component. The system 10 further includes one or more PSTN phones 14 and fax machines 16 coupled by the gateway 12 to the network 18.

The system 10 further includes a web server 20. Although shown as a single component, the web server 20 may include one or more components. The web server 20 is a computer including components typical of web servers, e.g., such as RAM, ROM, a processor, hard drive, floppy drive, tape drive, Zip ™ drive, CD-ROM, communications hardware, etc., and runs a multi-user multi-tasking operating system such as LINUX or UNIX, for example. Software is installed on the web server 20 to support chat, collaboration, e-mail, web phone, etc. Such web servers are known in the art and will not be discussed here in any detail. The system 10 further includes one or more client machines 22, 24, 26, 28, which are selectively coupled to the web server 20 by modem or other conventional communications method. The client machines 22, 24, 26, and 28 are computers, such as personal computers, computer terminals bearing software capable of one or more of: e-mail, web collaboration, chat, or web phone operation. Although FIG. 1 shows respective client machines 22, 24, 26, and 28 running different client software programs, it will of course be understood that the client machines are respectively capable of running more than one of the illustrated client programs. Because the web server 20 runs a multi-user, multitasking operating system, multiple clients could be running e-mail programs at the same time, multiple clients could be running chat sessions, multiple clients can be running web collaboration sessions, and multiple clients could be running web phone sessions all at the same time, for example.

The system 10 further includes an automatic call distribution server 30 which, in one embodiment, includes a computer including standard computer server components, such as RAM, ROM, a processor, hard drive, floppy drive, tape drive, Zip ™ drive, CD-ROM, communications hardware, etc. The automatic call distribution server 30 further includes memory (e.g., memory defined by the hard drive or on a medium readable by one of the other drives) defining a customer database 32 and defining customer rules and a rules engine 34.

The system 10 further includes a unified messaging server 36 which, in one embodiment, includes a computer including standard computer server components, such as RAM, ROM, a processor, hard drive, floppy drive, tape drive, Zip ™ drive, CD-ROM, communications hardware, etc. The unified messaging server 36 further includes memory (e.g., on the hard drive or on a medium readable by one of the other drives).

In one embodiment, the system 10 further includes one or more pagers 37 coupled to the unified messaging server 36 for wireless communications.

In operation, traditional PSTN phone calls come into the server 12 and are converted to IP (Internet Protocol) by the gateway 12. The calls are like any other IP voice call after being converted. ANI (Automatic Number Identification/Caller ID) is used by the automatic call distribution server 30 to aid in customer lookup, if the caller has a profile stored in the customer database 32. The customer database 32 can reside on or off a network 31 controlled by an administrator of the system 10 and to which the server 30 is coupled. Operators of one or more call facilities maintain the server 30 and customer database 32. Each call facility can have one or more human agents. FIG. 1 shows human agents 38, 40, 42, 44, and 46 respectively operating stations 48, 50, 52, 54, and 56. The stations 48, 50, 52, 54, and 56 include a computer, an IP phone, or both. Users of the PSTN phones 14 communicate with human agents via voice conversation.

The unified messaging server 36 handles facsimiles. A facsimile sent on a fax machine 16 comes in through the gateway 12 (the gateway 12 supports facsimile transmission) and via the network 18 is forwarded to the server 36. The facsimile image is converted, via OCR (optical character recognition) software residing on the unified messaging server 36, to a text format or word processing format. OCR software is known in the art. In one embodiment, the text is analyzed for content, (e.g., by the unified messaging server 36 or elsewhere) such as for digits stored in phone number format, words following keywords like TO/FROM etc., and such information is used, for example, to aid in customer lookup in the customer database 32. In one embodiment, the ANI information from the phone line used to send the facsimile is used to aid in customer lookup in the customer database 32.

The call distribution server 30 selects an agent 38, 40, 42, 44, or 46 to which to forward the facsimile based on rules defined in the rules engine 34. The facsimile is converted (e.g., by the unified messaging server 36) to an e-mail containing text from the OCR operation, or having a facsimile image attached, or both. After an agent is selected, the facsimile is routed (e.g., by the unified messaging server 36) to the selected agent, preferably in real-time. Further communication between the selected agent and the user can be via facsimile, e-mail, or voice callback. Callback can occur if the user's phone number is stored in the customer database 32 or is found in the text of the facsimile.

E-mails that are sent by a user using a client machine, e.g. client machine 22, are handled much like a facsimile, except that OCR does not need to take place. However, ANI is not available. The sender's E-mail address can be used as an equivalent. The call distribution server 30 selects an agent 38, 40, 42, 44, or 46 to which to forward the e-mail based on rules defined in the rules engine 34. Further communication between the selected agent and the user can be via facsimile, e-mail, or voice callback. Callback can occur if the user's phone number is stored in the customer database 32 or is found in the contents of the E-mail.

A user of a client machine has the option of requesting collaboration. This is illustrated in FIG. 1 by client machine 24. Collaboration is known in the art, and can include a chat session, but also includes the ability for the agent 38, 40, 42, 44, or 46 to "guide" the user through various web sites in real-time. With web collaboration, no ANI is available. The user's e-mail address may be obtained by the server 30 by standard web "cookie" files stored on the user's client machine 24, or by user entered information, or by user's IP address if fixed and not proxied through a firewall. Note that no user identification of any kind is required, but aids an agent in determining a user's needs. The call distribution server 30 selects an agent 38, 40, 42, 44, or 46 to which to forward the collaboration request based on rules defined in the rules engine 34. Further communication between the selected agent and the user will typically be by collaboration.

A user of a client machine has the option of requesting a chat session. This is illustrated in FIG. 1 by client machine 26. Chat is known in the art and chat rooms are available at web sites of on-line service providers such as America Online (™), for example. Much like, and often a part of collaboration, the user is able to request a real-time chat with an agent. This is also much like a voice call, simply using a different medium. The basic process is substantially similar.

A user of a client machine has the option of making a webphone call. This is illustrated in FIG. 1 by client machine 28. An IP voice call from a webphone looks like other voice calls, i.e., PSTN converted to IP. ANI might be available, as may a URL (universal resource locator), an E-mail address, or an IP address of the user. The ANI or other available information is used by the automatic call distribution server 30 to aid in customer lookup, if the caller has a profile stored in the customer database 32. Users of the webphones communicate with human agents via voice conversation.

A user of a client machine has the option of placing a page. This is illustrated in FIG. 1 by pager 37. This mechanism would be less used than the others, but may be useful in a small, specific call center that responds to field technicians, for example. A field technician pages a generic number, and his or her request is routed to the first available appropriate agent 38, 40, 42, 44, or 46 by the call distribution server 30 to return the call or otherwise respond to the page. The call distribution server 30 selects the agent 38, 40, 42, 44, or 46 based on rules defined in the rules engine 34. Further communication between the selected agent and the user may be by voice callback, facsimile, or page. A facsimile or page can occur if the user's facsimile or pager number is stored in customer database or found within the pager message.

As previously mentioned, various hardware configurations could be employed instead of the specific configuration illustrated in FIG. 1. For example, FIG. 1 shows a large number of components to illustrate a large number of alternative embodiments possible. The invention can be implemented with various subsets or supersets of the components shown in FIG. 1.

Figure 2:
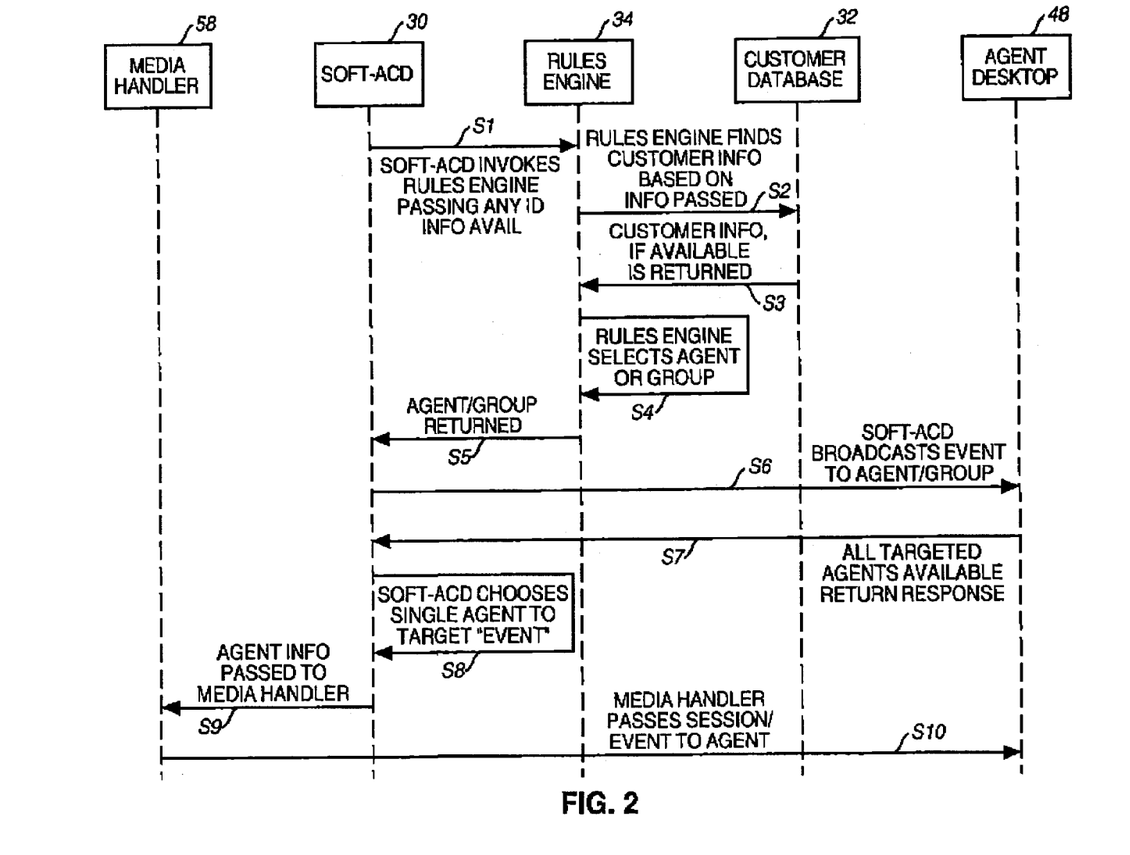
FIG. 2 is a flow diagram illustrating logic flow performed by the system of FIG. 1 to select an agent to process a request.

FIG. 2 illustrates logic performed by a server, such as the server 30, in one embodiment of the invention. The logic (hereinafter referred to as "Soft-ACD") can be implemented in computer program code embodied in a computer readable medium, such as a hard drive of a server, or embodied in a carrier wave transmitted to a server, such as the server 30 alone or in combination with other servers, or another server. In one embodiment, the logic is completely or partially embodied in discrete logic components or in one or more microprocessors instead of in software.

More particularly, FIG. 2 illustrates generally how the call distribution server 30 locates a specific agent to handle an incoming request, e.g. from a phone 14 or 28.

Prior art automatic call distribution systems typically maintain state, or know about all agents and what they are doing at any given time. This centralizes capability and limits scalability and flexibility. In contrast, the call distribution server 30 does not need to maintain state (though it can for statistical purposes). The call distribution server 30 instead queries the agents 38, 40, 42, 44, and 46 in real-time to determine their status and availability. This process is generally used regardless of whether the client machine is an e-mail client 22, a web collaboration client 24, a chat client 26, a web phone 28, or a PSTN phone 14 or a facsimile machine 16. The determination of which agent to use for a specific situation is performed by the rules engine 34. In one embodiment, the rules engine 34 is a conventional rules processing component. The rules engine 34 can use an inference engine, or simple sequential logic. Rules engines are known in the art and are described, for example, in U.S. Pat. No. 5,913,061 to Gupta et al., and in U.S. Pat. No. 5,933,816 to Zeanah et al., both of which are incorporated herein by reference.

The Soft-ACD uses publish/subscribe technology. More particularly, in one embodiment, publish/subscribe software is installed on the server 30. Publish/subscribe software is known in the art for other applications. See, for example, U.S. Pat. No. 5,913,061 to Gupta et al., which is incorporated herein by reference. Publish/subscribe software that is employed, in one embodiment, is TIB/Rendezvous™ software available from TIBCO of Palo Alto, Calif., which is described in U.S. Pat. Nos. 5,557,798, 5,257,369, and 5,187,787 to Skeen et al., all of which are incorporated herein by reference. In the embodiment shown in FIG. 2, agents "subscribe" to a set of skills such as language (English, French, Spanish, German, etc.) product (home electronics, appliances, music, computers, finance, returns, etc.), customer class (standard, silver, gold, etc.) or any other business defined skills. The rule-set defines the appropriate skills for a given user (e.g., based on previous contact) or media contact type (e-mail, voice call, chat, etc.). These skills can be updated by the agents in real time.

In steps S1, S2, and S3 (FIG. 2), the Soft-ACD generally uses any user identification available, such as ANI, e-mail address, phone number, user entered info, content of contact (e-mail content, for example) or other in order to perform a customer lookup.

More particularly, in the embodiment of FIG. 2, in step S1, the Soft-ACD 30 invokes the rules engine 34 and passes to the rules engine 34 any ID information available (e.g., ANI may be the first preference if multiple forms of information are available).

In step S2, the rules engine 34 finds customer information, if available, in the customer database 32 based on the ID information passed by the Soft-ACD. If no identification is available or the user is not in the database, the rules engine 34 uses a default mechanism, typically the first agent available. In one embodiment, depending on the incoming media type, (e.g. e-mail), a request may go to a predefined group of agents that typically handle request for that communications media or contact type (e.g., e-mail).

In step S3, customer information, if available, is returned to the rules engine.

In step S4, the rules engine 34 selects an agent or group of agents who have the required skills for the user and who are appropriate for the media type with which the user initiated the request.

The agent or group of agents is returned to the Soft-ACD in step S5.

After the skill(s) required are determined for a given user or media contact type, the Soft-ACD in step S6 broadcasts an event to the selected agent or group of agents stating that a user of a certain media contact type (chat, e-mail, voice call, etc.) is available needing this skill(s).

Because one or more agents with these skills (or all) may be busy, only currently available agents respond, in step S7, and there may be multiple available agents responding.

The Soft-ACD waits for a predetermined amount of time (typically no more than a few hundred milliseconds) and then selects, in step S8, one of the available responding agents based on rules in the rules engine 34 (e.g., first come, round robin, random, etc.).

The selected agent information is passed to a media handler or call treatment server 58, which may be separate from any of the servers shown in FIG. 1, in step S9.

The media handler passes the session or event to the selected .agent in step S10. If no agent is available, the user may be "parked" or may need to simply retry.

More particularly, the call treatment provided by the media handler provides interactive voice response, (music on hold, pushed ads, etc.) and is a separate service(s) depending on the media type. It is a hand-off point if the Soft-ACD cannot find an available agent. For example, if a chat request comes in from a web browser and no agents are available, in one embodiment, the Soft-ACD sends the request to the media handler. The media handler for chat, in one embodiment, pushes information via chat to the user automatically; e.g. chat-on-hold, or passes the user to "browser-on-hold" where it pushes HTML-based advertising until an agent becomes available. This is analogous to putting a voice caller in queue and playing music or ads. In the case of non-real time requests, such as e-mail or facsimile requests, this is really not needed and the e-mail (or fax converted to e-mail) simply goes to an agent or an agent group's e-mail box, because the user is not waiting for an immediate response. Alternatively, the media handler waits some period of time, such as a few seconds, and retries, and after a certain number of failed attempts puts the contact event into an agent's e-mail inbox to be processed as time allows.

If the request is a real-time request, such as a voice call, the call can be moved (parked) to an IVR (Interactive Voice Response), or music-on-hold. If the request is in the form of a collaboration or chat request, web-based advertising is provided, in one embodiment. Alternatively, if the request is a chat request, the user, in one embodiment, is moved to a "chat" broadcast of current events, news, advertising, etc.

In one embodiment, an auto-response is also returned, giving a best-guess response based on content of the contact. For example, the e-mail content or OCR converted text of a facsimile, in one embodiment, is analyzed, compared against a frequently asked questions database, and the most appropriate response e-mailed back to the user. In one embodiment, the rules engine 34 chooses this mechanism for all first-time e-mail from a given user or regarding a given question, and only routes the e-mail to a live agent on the second request.

Figure 3:
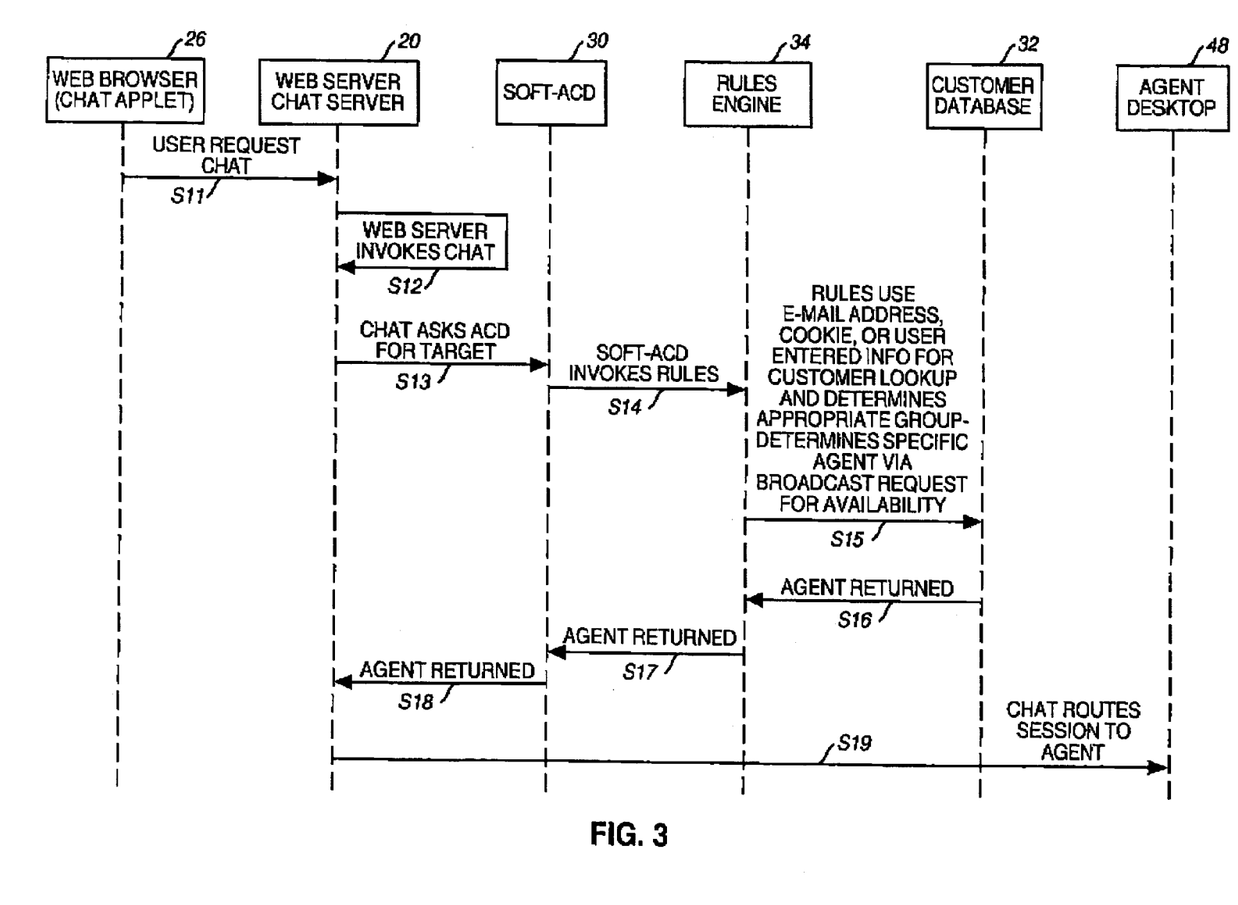
FIG. 3 is a flow diagram illustrating logic flow for the system of FIG. 1 to select an agent to process a request for a web chat.

FIG. 3 illustrates logic, in one embodiment of the invention, for handling a request by a user for a chat session. The logic can be implemented in computer program code embodied in a computer readable medium, such as a hard drive of a server, or embodied in a carrier wave transmitted to a server. In one embodiment, the logic is completely or partially embodied in discrete logic components or in one or more microprocessors instead of in software.

In step S11, a user requests a chat session.

In step S12, the web server 20 invokes chat software.

In step S13, chat asks the Soft-ACD for a target agent to handle the chat.

In step S14, the Soft-ACD invokes the rules engine 34.

In step S15, the rules engine uses an e-mail address, cookie, or user entered information for customer lookup and determines an appropriate group of agents with appropriate skills. A specific agent from that group is then determined via a broadcast request for availability. (FIG. 3 is simplified compared with FIG. 2 in that step S15 is illustrated as a single step while in FIG. 2, steps S2, S3, S4, S5, S6 and S7 are illustrated).

In steps S16, S17, and S18 a selection of the agent is returned to the server 20.

In step S19, chat routes the chat session to the selected agent.

Figure 4:
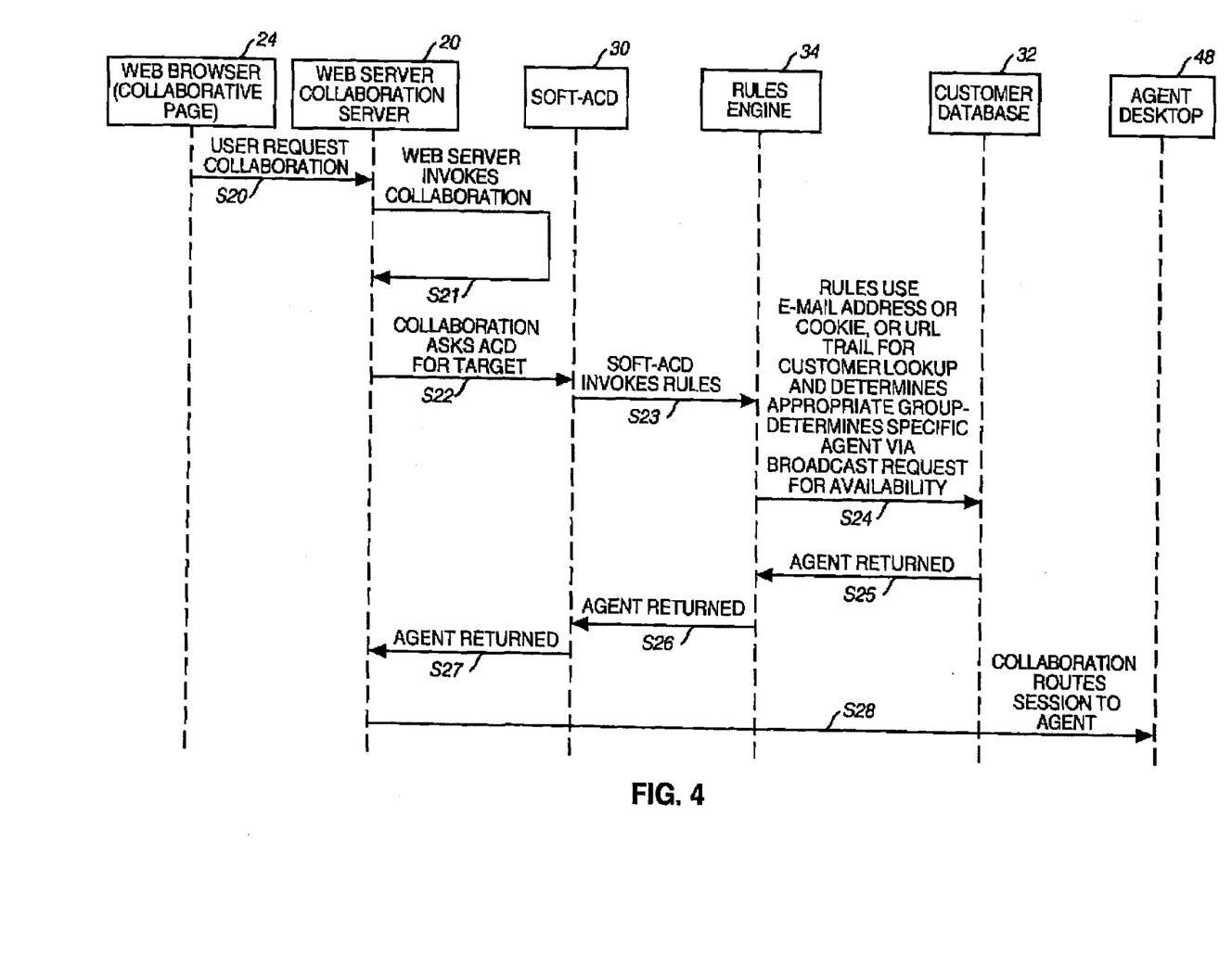
FIG. 4 is a flow diagram illustrating logic flow for the system of FIG. 1 to select an agent to process a request for collaboration.

FIG. 4 illustrates logic, in one embodiment of the invention, for handling a request by a user for a web collaboration session. The logic can be implemented in computer program code embodied in a computer readable medium, such as a hard drive of a server, or embodied in a carrier wave transmitted to a server. In one embodiment, the logic is completely or partially embodied in discrete logic components or in one or more microprocessors instead of in software.

In step S20, a user requests a web collaboration.

In step S21, the web server 20 invokes collaboration software.

In step S22, collaboration asks the Soft-ACD for a target agent to handle the collaboration.

In step S23, the Soft-ACD invokes the rules engine 34.

In step S24, the rules engine uses an e-mail address, cookie, or URL (or IP address) trail for customer lookup and determines an appropriate group of agents with appropriate skills. A specific agent from that group is then determined via a broadcast request for availability. (FIG. 4 is simplified compared with FIG. 2 in that step S24 is illustrated as a single step while in FIG. 2, steps S2, S3, S4, S5, S6 and S7 are illustrated).

In steps S25, S26, and S27 a selection of the agent is returned to the server 20.

In step S28, collaboration routes a chat session to the selected agent.

Figure 5:
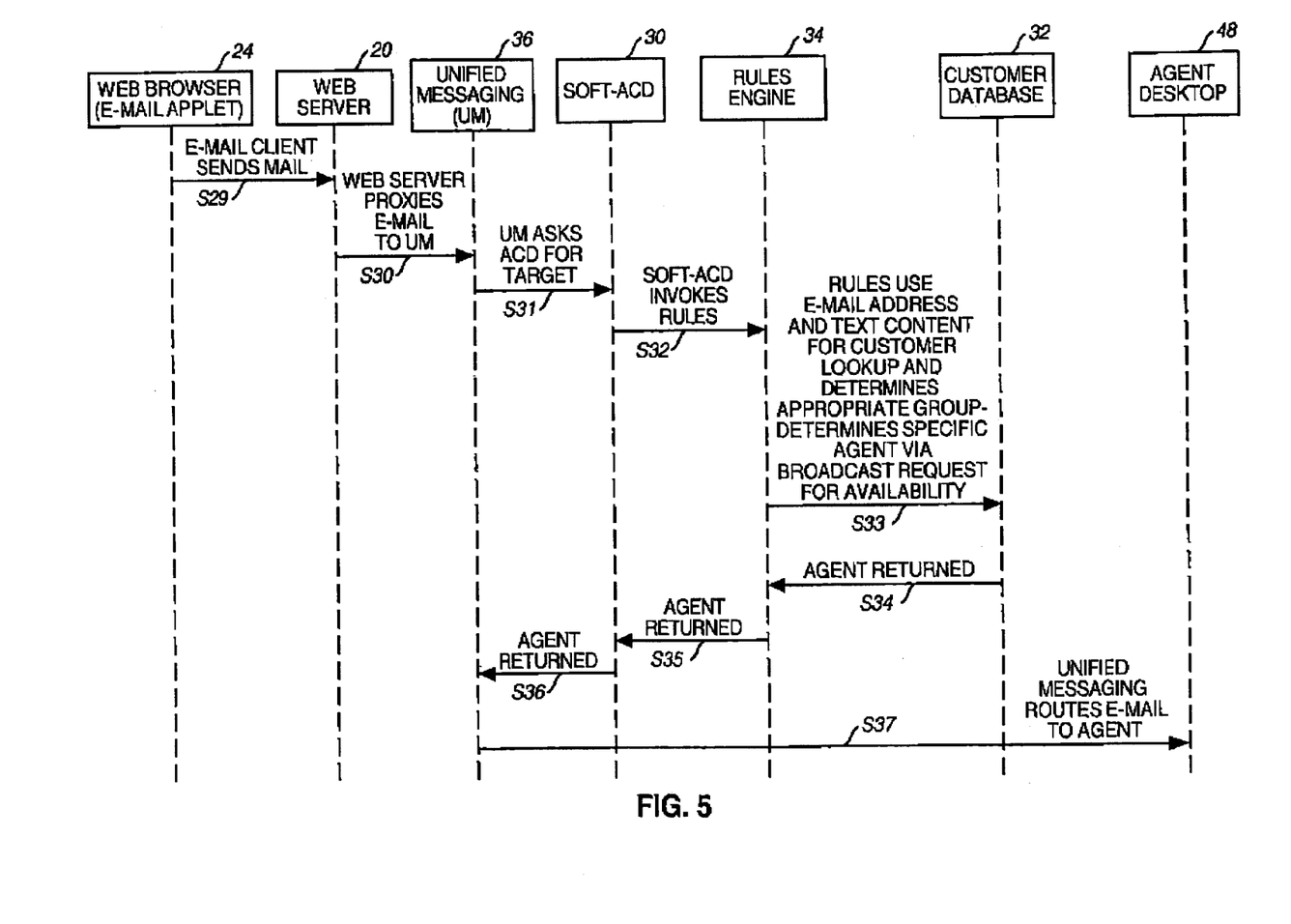
FIG. 5 is a flow diagram illustrating logic flow for the system of FIG. 1 to select an agent to process a request for collaboration.

FIG. 5 illustrates logic, in one embodiment of the invention, for handling an e-mail request by a user. The logic can be implemented in computer program code embodied in a computer readable medium, such as a hard drive of a server, or embodied in a carrier wave transmitted to a server. In one embodiment, the logic is completely or partially embodied in discrete logic components or in one or more microprocessors instead of in software.

In step S29, a user sends e-mail from a client machine.

In step S30, the web server 20 proxies the e-mail to the unified messaging server 36.

In step S31, the unified messaging server asks the Soft-ACD for a target.

In step S32, the Soft-ACD invokes the rules engine 34.

In step S33, the rules use the return e-mail address or e-mail text content to look up the user in the customer database 32, and determine the appropriate group of agents with appropriate skills. A specific agent from that group is then determined via a broadcast request for availability. (FIG. 5 is simplified compared with FIG. 2 in that step S33 is illustrated as a single step while in FIG. 2, steps S2, S3, S4, S5, S6 and S7 are illustrated).

In steps S34, S35, and S36 a selection of the agent is returned to the server 36.

In step S37, unified messaging routes the e-mail to the selected agent.

Note that the call distribution server 30 does not need to maintain agent state, but instead queries agent state in real-time using publish/subscribe technology. This allows multiple copies of the Soft-ACD software or server to exist at any given instance, (including redundant or geographic fail-over copies) allows the agents to change skills in real-time, and eliminates the need to login/logoff of the ACD service. This provides scalability and flexibility, and keeps the complexity of the Soft-ACD to a minimum. Combined with a generic rules engine, the Soft-ACD user (ACD customer) has added flexibility to determine how contacts (e-mail, Voice, Chat, etc.) are handled. The Soft-ACD is a process that can run on any general purpose platform costing as little as a few thousand dollars, and can run anywhere, including in the network (managed by a service provider) or on a corporation's premises.

A traditional ACD is a dedicated, expensive piece of hardware often costing hundreds of thousands of dollars, and having to reside at each customer's premise (in the customer's facility or data center). Therefore, the Soft-ACD can provide a cost reduction measuring 2–3 orders of magnitude or more, even for a handful of customers, while increasing flexibility manifold. One or more instances of the Soft-ACD can be created for each customer at an incremental cost approaching a few hundred dollars or less, depending on load requirements.

Although certain software processes have been illustrated as being implemented in certain servers, the processes could be distributed over multiple servers, centralized in a single server, or implemented by one or more microprocessors or discrete logic components without departing from the invention. The protection sought is not to be limited to the disclosed embodiments, which are given by way of example only, but instead is to be limited only by the scope of the appended claims as properly interpreted in accordance with the doctrine of equivalents.

What is claimed is:

1. An Internet Protocol (IP) call distribution system, for selecting an agent, from multiple possible agents, to handle incoming requests from users, the call distribution system comprising:

an IP gateway configured to convert PSTN phone calls to Internet Protocol phone calls, the IP gateway being configured to pass ANI information, if available, from the PSTN phone call;

a server configured to be coupled to the IP gateway by an Internet Protocol network, and configured to be coupled to agent workstations by the Internet Protocol network, the server having a publish/subscribe component, the server further including a call processing component which determines how incoming calls are to be handled, and a user database organized to include records about users and user ANI information associated with the users, the server for respective incoming calls, being configured to:

search the customer database for a record for the user making the call, by searching for a record containing the ANI information of the phone call;

apply rules appropriate for the user, using a rules engine, to determine a subset of agents with skills required to communicate with the user;

broadcast an event to the subset of agents indicating that a call is available to be handled;

receive responses from available agents of the subset; and select an available agent of the subset and pass the call to the selected agent;

wherein the agents subscribe to skills using the publish/subscribe component.

2. A call distribution system in accordance with claim 1 and further comprising a web server coupled to the first mentioned server via the Internet Protocol network, the web server being configured to receive e-mail from an e-mail client and forward the e-mail to the first mentioned server via the Internet Protocol network.

3. A call distribution system in accordance with claim 1 and further comprising a web server coupled to the first mentioned server via the Internet Protocol network, the web server being configured to receive e-mail from a user using an e-mail client and to forward the e-mail to the first mentioned server via the Internet Protocol network, the first mentioned server being further configured to:

search the customer database for a record for the user, by searching for a record containing the e-mail address of the user;

apply rules appropriate for the user, using the rules engine, to determine a second subset of agents, with skills required to communicate with the user;

broadcast an event to the second subset of agents indicating that an e-mail is available to be handled;

receive responses from available agents of the second subset; and select an available agent of the second subset and forward the e-mail to the selected agent.

4. A call distribution system in accordance with claim 1 and further comprising an Internet Protocol phone, coupled to the server via the Internet Protocol network, for use by an agent.

5. A call distribution system in accordance with claim 1 and further comprising a client machine, coupled to the server via the Internet Protocol network, for use by an agent.

6. A call distribution system in accordance with claim 1 and further comprising a unified messaging server coupled to the first mentioned server via the Internet Protocol network, the unified messaging server being configured to receive a facsimile from a facsimile machine, convert the facsimile to an e-mail, and forward the e-mail to the first mentioned server via the Internet Protocol network.

7. A call distribution system in accordance with claim 1 and further comprising a unified messaging server coupled to the first mentioned server via the Internet Protocol network, the unified messaging server being configured to receive a facsimile from a facsimile machine, perform optical character recognition on the facsimile to convert the facsimile to e-mail text, and forward the e-mail text, with the facsimile image appended, to the first mentioned server via the Internet Protocol network.

8. A call distribution system in accordance with claim 1 and further comprising a web collaboration server coupled to the first mentioned server via the Internet Protocol network, the web collaboration server being configured to receive a request for web collaboration from a user using a client machine and to forward the web collaboration request to the first mentioned server via the Internet Protocol network, the first mentioned server being further configured to:

search the customer database for a record for the user, by searching for a record containing address information of the user;

apply rules appropriate for the user, using the rules engine, to determine a second subset of agents, with skills required to communicate with the user;

broadcast an event to the second subset of agents indicating that a web collaboration request is available to be handled;

receive responses from available agents of the second subset; and select an available agent of the second subset and couple the client machine of the user who requested web collaboration to a client machine of the selected agent for web collaboration.

9. A call distribution system in accordance with claim 8 wherein searching the customer database for a record for the user who requested web collaboration comprises searching for a record containing IP address information for the user.

10. A call distribution system in accordance with claim 8 wherein searching the customer database for a record for the user who requested web collaboration comprises obtaining information for the user from a cookie stored on the user's client machine, and searching for a record containing information obtained from the cookie.

11. A call distribution system in accordance with the claim 8 wherein searching the customer database for a record for the user who requested a web chat comprises obtaining information for the user from a cookie stored on the user's client machine, and searching for a record containing information obtained from the cookie.

12. A call distribution system in accordance with claim 1 and further comprising a web server coupled to the first mentioned server via the Internet Protocol network, the web server being configured to receive a chat request from a user using a client machine and to forward the chat request to the first mentioned server via the Internet Protocol network, the first mentioned server being further configured to:

search the customer database for a record of the user, by searching for a record for the user, by searching for a record containing address information of the user;

apply rules appropriate for the user, using the rules engine, to determine a second subset of agents, with skills required to communicate with the user;

broadcast an event to the second subset of agents indicating that a chat request is available to be handled;

receive responses from available agents of the second subset; and select an available agent of the second subset and couple the client machine of the user who requested the chat to a client machine of the selected agent for a web chat.

13. A call distribution system in accordance with claim 12 wherein searching the customer database for a record for the user who requested a web chat comprises searching for a record containing IP address information for the user.

14. A call distribution method, for selecting an agent of multiple possible agents to handle an incoming request of one of many possible media types from a user, the call distribution method comprising:

receiving a subscription to skills from an agent, using publish/subscribe technology;

converting a PSTN phone call to an Internet Protocol phone call, and passing ANI information from the PSTN phone call;

searching a database for a record for the user, including searching for a record containing the ANI information;

applying rules appropriate for the user to determine a subset of agents subscribed to skills appropriate to communicate with the user;

broadcasting an event to the subset of agents indicating that a call is available to be handled;

receiving responses from available agents of the subset; and selecting an available agent of the subset and pass the call to the selected agent.

15. A call distribution method in accordance with claim 14 and further comprising storing call processing rules which determine how incoming calls are to be handled, and storing records about customers and customer ANI information associated with the customers.

16. A call distribution method in accordance with claim 14 and further comprising:

receiving e-mail from a user;

searching the database for a record for the user, by searching for a record containing the e-mail address of the user;

applying rules appropriate for the user to determine a second subset of agents, with skills required to communicate with the user;

broadcasting an event to the second subset of agents indicating that an e-mail is available to be handled;

receiving responses from available agents of the second subset; and selecting an available agent of the second subset and forwarding the e-mail to the selected agent.

17. A call distribution method in accordance with claim 14 and further comprising:

receiving a facsimile from a user using a facsimile machine, converting the facsimile to an e-mail;

searching the database for a record of the facsimile user, by searching for a record containing ANI information for the facsimile;

applying rules appropriate for the facsimile user to determine a second subset of agents, with skills required to communicate with the facsimile user;

broadcasting an event to the second subset of agents indicating that an e-mail is available to be handled;

receiving responses from available agents of the second subset; and selecting an available agent of the second subset and forwarding the e-mail to the selected agent.

18. A call distribution method in accordance with claim 14 and further comprising:

receiving a request for web collaboration from a client machine of a web collaboration user;

searching the customer database for a record for the web collaboration user; by searching for a record containing address information of the user;

applying rules appropriate for the web collaboration user to determine a second subset of agents, with skills required to communicate with the web collaboration user;

broadcasting an event to the second subset of agents indicating that a web collaboration request is available to be handled;

receiving responses from available agents of the second subset; and selecting an available agent of the second subset and coupling the client machine of the user who requested web collaboration to a client machine of the selected agent for web collaboration.

19. A call distribution method in accordance with claim 14 and further comprising:

receiving a request for chat from a client machine of a web collaboration user;

searching the customer database for a record for the chat user, by searching for a record containing address information of the chat user;

applying rules appropriate for the user, using the rules engine, to determine a second subset of agents, with skills required to communicate with the user;

broadcasting an event to the second subset of agents indicating that a chat requested is available to be handled;

receiving responses from available agents of the second subset; and selecting an available agent of the second subset and couple the client machine of the user who requested the chat to a client machine of the selected agent for a web chat.

20. A computer readable medium embodying program code for selecting an agent to handle an incoming request from a user in an Internet Protocol call distribution system, for use with rules for a determining how incoming requests are to be handled, and with a customer database having records for users, the program code being configured to cause a computer, when in operation, to:

receive publish/subscribe subscriptions from agents identifying skills respective agents possess from multiple possible skills;

search the customer database for a record for the user, by searching for a record containing user identification information corresponding to user identification information associated with the incoming request;

use the rules to determine a subset of agents with skills required to communicate with the user;

broadcast an event to the subject of agents indicating that a request is available to be handled;

receive responses from available agents of the subset; and select an available agent of the subset and pass the call to the selected agent.

21. A computer readable medium in accordance with claim 20, wherein the program code is further configured to cause the computer, when in operation, to:

store rules which determine how incoming requests are to be handled; and store records about users and user ANI information associated with the users.

22. A computer readable medium in accordance with claim 20 wherein, if the request is in the form of an e-mail, searching the customer database for a record for the user comprises searching for a record containing the e-mail address of the user.

23. A computer readable medium in accordance with claim 20 wherein, if the request is in the form of a voice call, searching the customer database for a record for the user comprises searching for a record containing ANI information for the voice call.

24. A computer readable medium in accordance with claim 20 wherein, if the request is in the form of a facsimile, searching the customer database for a record for the user comprises searching for a record containing ANI information for the facsimile.

25. A computer readable medium in accordance with claim 20 wherein determining a subset of agents comprises determining which agents subscribed to a skill indicating they can handle the media type of the request.

26. A method for selecting an agent to handle an incoming request from a user in a call distribution system, the method comprising:

receiving a publish/subscribe subscription from an agent identifying skills respective agents possess from multiple possible skills;

searching a customer database for a record for a user, by searching for a record containing user identification information corresponding to user identification information associated with an incoming request;

applying rules appropriate for the user to determine a subset of agents with skills required to communicate with the user;

broadcasting an event to the subject of agents indicating that request is available to be handled;

receiving responses from available agents of the subset; and selecting an available agent of the subset and passing the request to the selected agent.

27. A method for selecting an agent in accordance with claim 26, and further comprising:

storing rules which determine how incoming requests are to be handled; and storing records about users and user ANI information associated with the users.

28. A method for selecting an agent in accordance with claim 26 wherein, if the request is in the form of an e-mail, searching the customer database for a record for the user comprises searching for a record containing the e-mail address of the user.

29. A method for selecting an agent in accordance with claim 26 wherein, if the request is in the form of a voice call, searching the customer database for a record for the user comprises searching for a record containing ANI information for the voice call.

30. A method for selecting an agent in accordance with claim 26 wherein, if the request is in the form of a facsimile, searching the customer database for a record for the user comprises searching for a record containing ANI information for the facsimile.

* * * * *